United States Patent
Mannal et al.

(10) Patent No.: US 7,869,365 B2
(45) Date of Patent: *Jan. 11, 2011

(54) SYSTEM AND PROGRAM STORAGE DEVICE FOR CONTROLLING DATA PACKET FLOWS BY MANIPULATING DATA PACKETS ACCORDING TO AN ACTUAL MANIPULATION RATE

(75) Inventors: Soenke V. Mannal, Waldachtal (DE); Roman A. Pletka, Horgen (CH); Marcel Waldvogel, Stein am Rhein (CH)

(73) Assignee: International Business Machines Corporation, Armonk, NY (US)

( * ) Notice: Subject to any disclaimer, the term of this patent is extended or adjusted under 35 U.S.C. 154(b) by 81 days.

This patent is subject to a terminal disclaimer.

(21) Appl. No.: 12/215,007

(22) Filed: Jun. 24, 2008

(65) Prior Publication Data

US 2008/0267070 A1 Oct. 30, 2008

Related U.S. Application Data

(63) Continuation of application No. 10/808,995, filed on Mar. 25, 2004, now Pat. No. 7,468,947.

(30) Foreign Application Priority Data

Mar. 31, 2003 (EP) .................................. 03007222

(51) Int. Cl.
*H04L 12/26* (2006.01)
(52) U.S. Cl. ...................................... 370/236; 370/253
(58) Field of Classification Search ....................... None
See application file for complete search history.

(56) References Cited

U.S. PATENT DOCUMENTS

| 6,515,963 | B1* | 2/2003 | Bechtolsheim et al. ...... 370/229 |
| 6,625,118 | B1* | 9/2003 | Hadi Salim et al. ......... 370/229 |
| 7,468,947 | B2* | 12/2008 | Mannal et al. ............... 370/236 |
| 2002/0154602 | A1* | 10/2002 | Garcia-Luna-Aceves et al. ............. 370/230 |
| 2005/0047342 | A1* | 3/2005 | Babiarz ....................... 370/232 |
| 2005/0195740 | A1* | 9/2005 | Kwon ........................... 370/229 |

* cited by examiner

*Primary Examiner*—Min Jung
(74) *Attorney, Agent, or Firm*—Derek S. Jennings; Anne Vachon Dougherty

(57) ABSTRACT

A network device and a computer program element are introduced for controlling data packet flows in a network device by manipulating data packets according to an actual manipulation rate. Amongst data packets received by a network device such as a router, data packets are identified that are marked with a pattern according to a congestion notification scheme. A pattern rate of data packets comprising such a pattern is determined, and the actual manipulation rate is determined subject to the pattern rate.

5 Claims, 3 Drawing Sheets

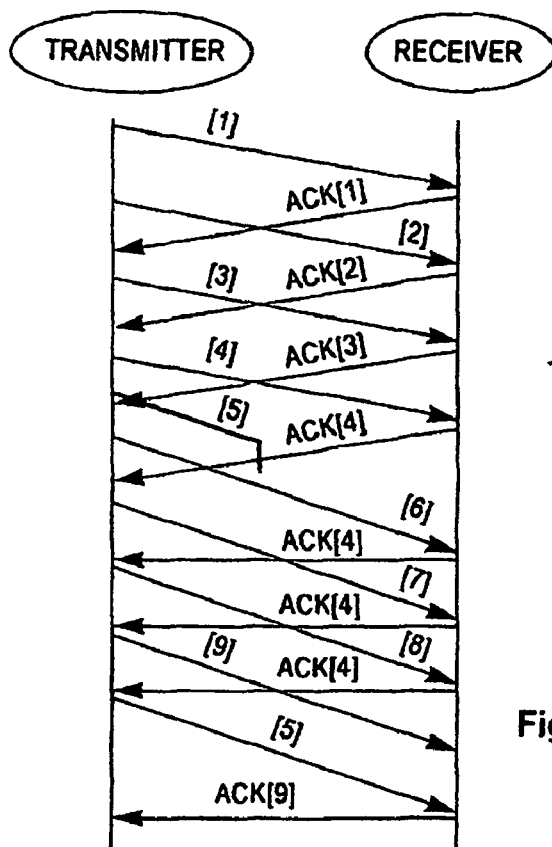
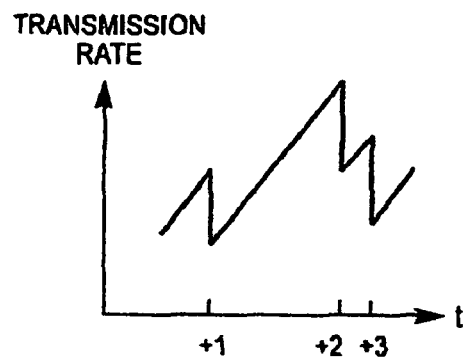
Fig. 2
Fig. 1
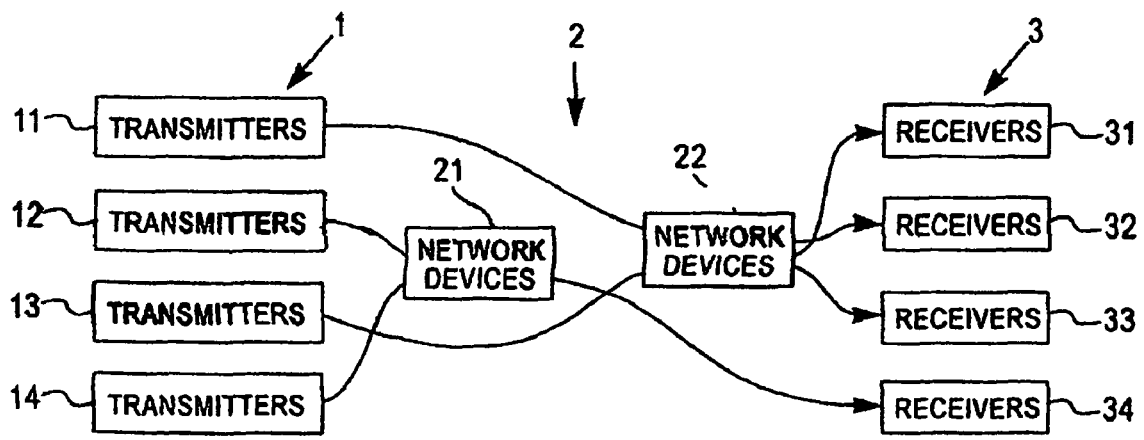
Fig. 3

SYSTEM AND PROGRAM STORAGE DEVICE FOR CONTROLLING DATA PACKET FLOWS BY MANIPULATING DATA PACKETS ACCORDING TO AN ACTUAL MANIPULATION RATE

CROSS REFERENCE

This is a Continuation of Ser. No. 10/808,995 filed Mar. 25, 2004 now U.S. Pat. No. 7,468,947.

TECHNICAL FIELD

The present invention relates to methods, a network device and a computer program element for controlling data packet flows in a network device by manipulating data packets according to an actual manipulation rate.

DESCRIPTION OF PRIOR ART

The dominant transport protocol used today in the Internet is TCP, the Transmission Control Protocol, which is encapsulated in the Internet Protocol (IP). TCP is used whenever reliable transmission is needed, such as for the World Wide Web, wherein the Hypertext Transport Protocol, HTTP, and the File Transfer Protocol, FTP, utilize TCP.

Reliable data transport in TCP is based on the acknowledgment of transmitted data packets. A TCP data packet transmitted from a sender to a receiver is expected to be acknowledged by the receiver upon receipt. There are several ways to find out whether a data packet got lost on its way from sender to receiver. For instance, the sender sets a timer when a data packet is sent. Once no acknowledgment is received within the timer period, the data packet is regarded as lost.

Another way of packet loss detection is shown in FIG. 1. A sender—also called transmitter—transmits data packets [i] to a receiver. The receiver acknowledges having received all data packets up to [i] with ACK[i]. Data packets [1] to [4] are transmitted to the receiver and the receiver acknowledges receipt of data packets [1] to [4] by ACK[1] to ACK[4]. Data packet [5] is lost somewhere on its way to the receiver. Following data packets [6] to [9] are transmitted without packet loss. As the receiver always acknowledges the data packet removed with the highest sequence number out of a sequence of received consecutive data packets, data packets [6] to [8] are not acknowledged with ACK[6] to ACK[8], but are acknowledged each time with ACK[4] since data packet [4] has the highest sequence number received out of a sequence of consecutive data packets. Data packets [6] to [8] are not considered to be part of the sequence since data packet [5] has not arrived yet. At the sender, a routine for taking notice of a lost data packet is introduced: Once the same data packet, e.g. data packet [4], is acknowledged four times, the data packet with the next sequence number, e.g. data packet [5], is regarded as lost. Thus, data packet [5] is retransmitted according to FIG. 1. Upon receipt of data packet [5], data packet [9] is acknowledged since data packet [9] is now the data packet with the highest sequence number out of a sequence of received data packets.

Whenever a packet loss occurs, the sender assumes that the packet was dropped by intermediate routers due to link congestion. Link congestion typically results from exceeding the transmit rate on the link as well as the given limited buffer space in the router. Packets are dropped by routers before a queue becomes full in order to prevent the network from operating under a overloaded regime which might result in severe service degradation including grid-lock situations.

Upon packet loss, the sender reduces its transmission rate by reducing a transmit window which results in an immediate reduction of the transmission rate by a fixed factor, typically by 50%, in order to avoid congestion collapse. This behavior is called "Multiplicative Decrease". After having reduced the transmission rate, the sender slowly but linearly increases its transmission rate in order to probe for further available bandwidth. This behavior is called "Additive Increase". The increase continues until another packet loss occurs. FIG. 2 shows an example of a transmission rate over time t with "Multiplicative Decreases" at times t1, t2 and t3, and "Additive Increases" during periods [t1-t2], [t2-t3], [t3-].

The entire process is known as AIMD (Additive Increase, Multiplicative Decrease). AIMD reflects TCP's basic behavior during bulk transmission, wherein the same process occurs independently for every TCP session.

In connection with the TCP protocol, the term Round Trip Time (RTT) is introduced. RTT is considered as a time value representing a period starting with the transmission of a data packets at the sender, and ending with a receipt of the corresponding acknowledgment note at the sender. Within one RTT several packet losses might occur. A loss event includes all packet losses within one RTT. Typically, transmission rate is reduced only once, even if more packet losses are detected within one RTT. "Multiplicative Decrease" thus is linked to a loss event more than to a single packet loss.

Some of the properties of TCP as a result of the AIMD behavior include: TCP provides more or less fair sharing of the available link bandwidth. TCP adapts quickly to congestion, hence avoiding congestion collapse. TCP adapts to freshly available bandwidth, e.g. when another session terminates. A notable difference between basic AIMD and the version used in TCP is that in the TCP version, the transmission rate is reduced at most once during each packet transmission round-trip time. This is to prevent overly drastic reduction of transmission rates during short periods of heavy congestion. The loss of at least one packet within a round trip time is known as loss event.

However, TCP adapts too slowly on links with a long round-trip time (RTT) and high bandwidth: TCP increases by roughly 10 kbit/RTT; for RTT=200 ms—e.g. on a transatlantic link—, a single TCP connection requires 100 RTT=20 s to re-claim a 1 Mbit/s link, or 10 s to recover after a drop-to-half rate reduction which occurs whenever a loss event occurs. In grid computing, link speeds closer to 1 Gbit/s—often on dedicated lines—are used and higher speeds are foreseen. For a RTT=50 ms—which is a typical RTT for a link within a country or a continent—, 100 000 RTT would be required to adapt, which is roughly 1.5 h and thus not very useful.

The packet arrival rate in the Internet is bursty and self-similar. Together with the constant pressure from TCP to expand its bandwidth, this assures that temporary congestion and thus packet loss will happen. Efficiently dealing with packet loss is hard, as TCP will react harshly to packet loss, as discussed above. The actual impact of a single loss on offered load depends on the parameters of the flow upon which the loss was inflicted. Currently, a large number of mechanisms exist which try to give a balance between length of a router's link output queue, its impact on end-to-end delay and the ability to absorb bursts.

"Equation-Based Congestion Control for Unicast Applications: The Extended Version", Sally Floyd et al., International Computer Science Institute tech report TR-00-003, March 2000, discloses formulas describing the long-term behavior of TCP flows.

"A Rate-based End-to-end Multicast Congestion Control Protocol", Sherlia Shi and Marcel Waldvogel, In Proc. of IEEE Symposium on Computers and Communications (ISCC), pp. 678-686, Antibes, France, July 2001, introduces a TCP formula to provide a rated-controlled TCP-fair transmission rate in scenarios not covered by TCP, namely multicast.

"Equation-Based Packet Marking for Assured Forwarding Services", Mohamed A. El-Gendy and Kang G. Shin, Proceedings of IEEE INFOCOM 2002, June 2002, pp. 845-854, describes the use of a TCP equation to mark packets for preferential dropping.

"Controlling High Bandwidth Aggregates in the Network (Extended Version)", Ratul Manajan, et al., July, 2001, accessed on the Internet http://www.icir.org/pushback/, March, 26, 2003, looks at congestion in a network with regard to identifying and preventing denial-of-service attacks.

"A Comparison of End-to-End Congestion Control Algorithms: The Case of AIMD and AIPD", Kang-Won Lee et al., Proceedings of INFOCOM 2001, investigates the difference between reduction of the sending rate proportional to the fraction of packet loss and reduction of the sending rate independent of the loss fraction in AIMD-based congestion control algorithms.

"The Addition of Explicit Congestion Notification (ECN) to IP, K. K Ramakrishnan", Sally Floyd, and David L. Black, IETF RFC 3168 (Standards Track), September 2001, accessed on the Internet http://www.ietf.org/rfc/rfc3168.txt on March, 26, 2003, describes the explicit congestion notification protocol ECN. The basic notion uses two bits in the IP header, where routers can signal congestion by setting bits in the header ("Congestion Experienced", or "CE"). The receiver will reflect this back to the sender using abit in the TCP header ("Explicit Congestion Echo", or "ECE"), which will be acknowledged by the sender setting another bit in the TCP header ("Congestion Window Reduced" or "CWR")

"Performance Evaluation of Explicit Congestion Notification (ECN) in IP Networks", J. Hadi Salim and U. Ahmed, IETF RFC 2884 (Informational), July 2000, accessed on the Internet http://www.kblabs.com/lab/lib/rfcs/2800/rfc2884.txt.html on Mar. 26, 2003, provides performance results from an ECN implementation on Linux in conjunction with a Random Early Detection (RED) mechanism.

"TCP Rate Control Using Active ECN Mechanism with RTT-Based Marking Probability", Takahiro Matsuda et al., The 16th International Workshop on Communications Quality & Reliability (CQR 2002) pp. 112-116, Okinawa, May 2002, proposes an ECN-implementing router at an access router which adds an ECN bit to ACK packets with a different probability according to the RTT. Since ECN-capable TCP senders reduce their congestion window sizes whenever they receive an ACK with an ECN bit (namely, ECE), the mechanism can realize similar transmission rate among TCP connections with different RTT's.

"A Linear Dynamic Model for Design of Stable Explicit-Rate ABR Control Schemes," Y. Zhao et al., INFOCOM '97, Sixteenth Annual Joint Conference of the IEEE Computer and Communications Societies, Apr. 9-11, 1997, p. 283 ff, introduces another method that provides flags to data packets. The flags are set by intermediate switches of the network in order to indicated whether none, light or serious congestion was encountered.

Most of these mechanisms take a local router's view by focusing on router's parameters only, such as queue length and others. As a result, it requires multiple round-trip times to adjust the drop rates, by which time the network parameters may have changed significantly.

Therefore, it is desired to introduce an improved control mechanism for data packet flows in a network device by manipulating data packets according to an actual manipulation rate.

SUMMARY OF THE INVENTION

According to one aspect of the invention, there is provided a method of controlling data packet flows in a network device by manipulating data packets according to an actual manipulation rate. Amongst received data packets in a network device, data packets are identified that are marked with a pattern according to a congestion notification scheme. A pattern rate of data packets comprising the pattern is determined. The actual manipulation rate then is subject to the pattern rate.

According to another aspect of the present invention, there is provided a method of controlling data packet flows in a network device by manipulating data packets according to an actual manipulation rate. This method comprises steps of determining a first manipulation rate representing an actual rate of data packets manipulated on a route from transmitters of the data packets to respective receivers via the network device, determining a second manipulation rate representing an actual rate of data packets manipulated on a route from the transmitters to the network device, determining a third manipulation rate representing an actual rate of data packets manipulated on a route from the network device to the receivers, and determining the actual. manipulation rate dependent on the first manipulation rate, the second manipulation rate and the third manipulation rate.

Both methods make use of investigating traffic conditions over the entire network. According to the first method, one or more patterns according to a congestion notification scheme are investigated. Examples of congestion notification schemes are explained in more detail below. Such patterns are set or attached to data packets subject to congestion somewhere in the network. Hence, when looking for such patterns attached to data packets arriving at the network device, the network device gets an idea of congestion in other parts of the network, at least with regard to connections which run via the network device. Accordingly, the network device takes congestion elsewhere in the network into account for determining its own manipulation rate.

The second method enlightens the invention from another point of view. Basically, parameters are defined and determined that contribute to a determination of the device's actual manipulation rate. At least some of the parameters used represent at least in an indirect way congestion conditions somewhere else in the network. Again, not only parameters of the local device are relevant for determining an actual manipulation rate, but traffic conditions on the network with regard to connections which run through the network device are taken into account for determining the actual manipulation rate of the network device.

Manipulating data packets according to the invention includes dropping data packets. In order to avoid complete congestion at the network device—the network device might also be called a router in the future—, the router might drop data packets according to the actual manipulation rate.

Manipulating data packets according to the invention might alternatively or additionally include marking data packets with a specified pattern according to the manipulation rate. Marking data packets is typically performed when there are indications that the router might be congested soon, and when data packets are generally subject to marking.

Other manipulation of data packets might be possible. Such manipulation might either impact the actual data packet flows immediately by hard means such as dropping data packets, or might impact data packet flows by soft means such as marking data packets in order to notify other routers, transmitters or receivers, that a congestion situation is ready to arise.

The reference value for the actual manipulation rate might be arriving data packets, or might be arriving data packets that can be subject to marking patterns when manipulation is represented by marking data packets, or might be time, but is not limited to. In the first embodiment, the actual manipulation rate determines how many packets of the arrived packets will be manipulated. In the second embodiment, the actual manipulation rate determines how many of the arrived data packets that can be subject to marks are actually subject to marking or other manipulation. In the third embodiment, the actual manipulation rate determines how many packets per time unit will be manipulated.

The term data packet comprises any representation of information in a network, and thus might physically be represented by a single byte or a more complex word, but is not limited to.

By taking parameters such as e.g. packet loss created by other network devices into consideration, the network device output can also be adjusted to the needs of improved packet flow elsewhere in the network. This helps to establish an optimum throughput for many data packet flows.

The methods perform active queue management (AQM) and achieve optimal router utilization with minimal queuing delays without the need to manually tune for the current environment. AQM control is achieved with high accuracy and immediate response (e.g., within a single RTT).

Knowing that the congestion-control back-off behavior of end systems is advantageous, i.e., how they will react to congestion indication from the routers allows for accurate control of the manipulation rate, when the parameters of the connections are known.

With regard to the method introduced first, it is preferred to determine a first manipulation rate representing an actual rate of data packets manipulated on a route from transmitters— also called senders—of the data packets to respective receivers via the network device, to determine a second manipulation rate representing an actual rate of data packets manipulated on a route from the transmitters to the network device, to determine a third manipulation rate representing an actual rate of data packets manipulated on a route from the network device to the receivers. The actual manipulation rate is calculated based on the first manipulation rate, the second manipulation rate and the third manipulation rate, wherein at least one of the first, second or third manipulation rate is based on the pattern rate.

With regard to this embodiment and to the second method as proposed above, the term manipulating might again be interpreted in different ways as explained before. Again, with regard to the first, second, or third manipulation rate as well as for the fourth, fifth or sixth manipulation rates as will be introduced below, and with regard to the various pattern rates, the reference value might be formed by arriving data packets, or, in particular by arriving data packets that can be subject to marking patterns when manipulation is represented by marking data packets, or by time, but is not limited to.

With regard to the method introduced second, it is preferred that data packets are identified that are marked with a pattern according to a congestion notification scheme. A pattern rate is determined out of data packets comprising a pattern, and at least one of the first, second or third manipulation rate is determined based on the pattern rate.

According to a preferred embodiment of the present invention, a congestion experienced pattern rate is determined, the rate indicating a rate of data packets comprising a congestion experienced pattern which in turn indicates a congestion, preferably set at some other router within the network. Such pattern is preferably part of a congestion notification scheme, and indicates that a congestion was experienced somewhere on the way the data packet took from the sender to the receiver. Typically, a router or other network device attaches or sets a congestion experienced pattern to a data packet whenever the router is aware of an actual or upcoming local congestion. The respective data packet then keeps on traveling through the network with the pattern attached. In this embodiment, the second manipulation rate depends on the congestion experienced pattern rate, and preferably is represented by the congestion experienced pattern rate. By counting all the congestion experienced marked data packets at the network device location, e.g. amongst all the congestion notification scheme aware packets, a rate of all the congestion experienced connections running through the network device can be determined. The congestion experienced pattern rate to be determined at the network device reflects all the congestion that is introduced on the route data packets took from the respective senders to the network device.

In another preferred embodiment, a congestion reaction pattern rate is determined. A congestion reaction pattern is typically attached to a transmitted data packet by the sender when an acknowledgment of a congestion experienced marked data packet is received from the receiver of the congestion experienced marked data packet. Typically, along with setting the congestion reaction pattern, the sender reduces the transmission rate of data packets. Accordingly, the congestion reaction pattern rate indicates a rate of data packets comprising a congestion reaction pattern indicating a reaction that was taken upon a congestion. When determining a congestion reaction pattern rate, this pattern rate typically represents a rate of data packets manipulated on their route from respective senders to respective receivers. In contrast to the congestion experienced pattern that can also be set by a router, the congestion reaction pattern is only set by senders. The congestion reaction pattern rate represents a rate of all data packets manipulated somewhere on the route between the senders and the receivers, since the congestion reaction pattern is set in response to appearance of a congestion experienced pattern. However, the congestion reaction pattern rate that is actually determined typically reflects a congestion situation with a delay of one round trip time cycle, since the congestion reaction pattern is set after an acknowledgment of a data packet comprising the congestion experienced pattern is received. Thus, a fourth manipulation rate is preferably determined, the fourth manipulation rate representing a previous rate of data packets manipulated on a route from transmitters of data packets to respective receivers via the network device. The fourth manipulation rate is made dependent on the congestion reaction pattern rate that can actually be measured. In addition, the first manipulation rate is preferably calculated subject to the fourth manipulation rate.

Preferably, the first manipulation rate is additionally subject to the load of the network device. The load might be determined by means of an arrival rate of data packets representing a rate of data packets arriving at the network device. The arrival rate, and the load are preferably rates related to a time bases, such as bit/sec or byte/sec. The load or the arrival rate are typically measured and averaged over a short recent period, e.g. the past 100 ms.

Preferably, the first manipulation rate is determined dependent on a given link rate, the link rate specifying an optimum rate of data packets to be handled by the network device. The link rate is preferably a rate related to a time bases, such as bit/sec or byte/sec.

In another preferred embodiment, the third manipulation rate is determined by a fifth manipulation rate, the fifth manipulation rate representing a rate of data packets previously marked as having experienced congestion on a route from the network device to the receivers.

Preferably, the fifth manipulation rate is determined by the fourth manipulation rate, a previous manipulation rate representing data packets being previously marked as having reacted to congestion by the network device, and a sixth manipulation rate representing a previous rate of data packets dropped on a route from the transmitters to the network device Preferably, the previous manipulation rate and the sixth manipulation rate are stored in the network device.

According to another aspect of the present invention, there is provided a network device, comprising a control unit being configured for performing a method according to any one of the method claims. Preferably, the network device is a router for forwarding data packets.

According to another aspect of the present invention, there is provided a computer program element comprising computer readable program code, executable by a digital processing unit to perform a method according to any one of the claims. Such computer program element can be executed on a network device as claimed above.

It is to be understood that, in general where features are described herein with reference to a method embodying the invention, corresponding features may be provided in accordance with apparatus embodying the invention, and vice versa.

BRIEF DESCRIPTION OF THE DRAWINGS

The invention and its embodiments will be more fully appreciated by reference to the following detailed description of presently preferred but nonetheless illustrative embodiments in accordance with the present invention when taken in conjunction with the accompanying drawings.

The figures are illustrating:

FIG. 1 a flow chart of data packets between a transmitter and a receiver in a TCP connection, according to prior art;

FIG. 2 a chart showing a steady state TCP transmission rate according to the AIL process;

FIG. 3 a block diagram of a network including a network device, in accordance with an embodiment of the present invention;

Figure 4:
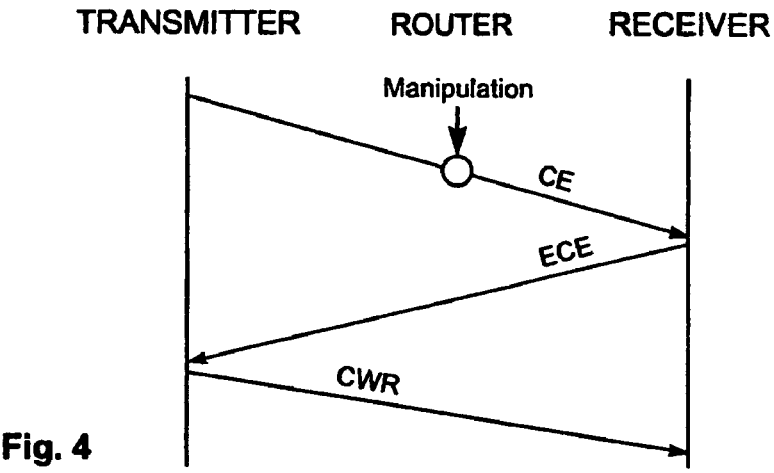
FIG. 4 a flow chart of data packets between a transmitter and a receiver, explaining the ECN notification scheme.

Different figures may contain identical references, representing elements with similar or uniform content.

DETAILED DESCRIPTION OF THE INVENTION

FIG. 3 illustrates a block diagram of a network with transmitters 1, in particular transmitters 11, 12, 13, 14, with receivers 3, in particular receivers 31, 32, 33, 34, and network devices 2, in particular network devices 21 and 22. Arrows represent data flows from respective transmitters I to respective receivers 3 via network devices 2. The diagram shows of only a simplified structure of a network. Network device 22 for example is supposed to support the proposed methods for controlling data flows. Not necessarily all network devices within a network have to support one of the proposed methods, since an overall benefit with regard to congestion control can be achieved even when only selected network devices, or even only one network device implements a method proposed.

In all further embodiments illustrated in the following figures, it is made use of a congestion notification scheme that is known as Explicit Congestion Notification (ECN [RFC3168]). The corresponding RFC is hereby incorporated by reference. Nevertheless, the invention is not limited to the presence of the ECN scheme: Any other congestion notification scheme can serve for the purpose of detecting congestion over the network.

Traditional congestion treatment without an explicit congestion notification scheme works as follows, assuming that TCP as the transmission protocol used: When a router experiences congestion on an outgoing link, it starts dropping packets. The receiver will then inform—typically by not acknowledging the missing packet—the sender of this loss. The sender will then assume congestion happened, reduce its transmission rate significantly—e.g. of 50%—and then slowly start probing for available bandwidth again. Reference is made to the introduction part discussing this treatment under the term AIMD.

However, by dropping the packet it will not reach its destination. It may reach its destination only after a retransmit, including a potential long time-out. When the packet will be retransmitted, a second copy travels over some links again, potentially causing additional congestion. ECN improves this treatment by using two bits in the IP header and two bits in the TCP header to find out about congestion and let the sender know. Whenever an outgoing link is congested or seems to be congested in near future, the router checks whether the IP header indicates that the participating end systems are ECN-aware. If so, it does not drop the packet, but instead marks the IP header with a "congestion experienced" (CE) pattern. An example of such communication is depicted in FIG. 4. The transmitter sends a data packet indicated by an arrow to the receiver. The router detects a local congestion and manipulates the data packet by marking it with the CE pattern. Whenever the receiver sees a congestion experienced pattern, it will start setting a pattern "ECN echo" (ECE) continuously for every ACK packet it sends back to the transmitter, indicating by the pattern ECE that this channel is congested.

As soon as the transmitter sees an ECE pattern, it will send back a pattern "congestion window reduced" (CWR) in the next data packet, indicating that the sender reduced its sending rate. The transmitter will simultaneously reduce its transmission rate of data packets. The receiver will stop setting ECE as soon as it sees a CWR pattern, until the next CE pattern appears. More specific details can be found in RFC3168.

Figure 5:
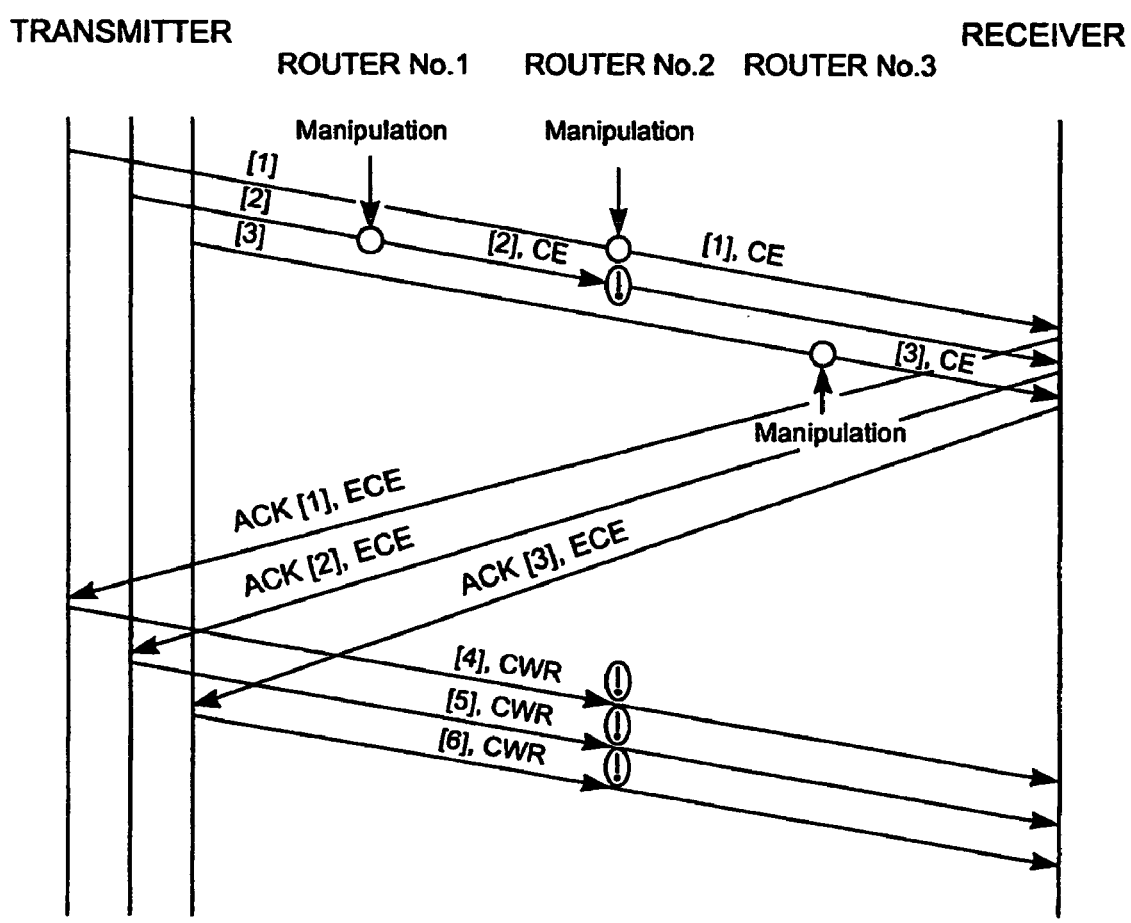
FIG. 5 a flow chart of data packets between transmitters and a receiver, introducing a method of determining a manipulation rate at the second router, in accordance with an embodiment of the present invention.

FIG. 5 shows a symbolic communication between transmitters No. 1, 2, and 3 and a receiver. A limited number of transmitters and receivers is introduced for demonstration purposes only. Included is the transmission of three data packets [1] to [3], a single one sent out by each transmitter, via routers No. 1, 2 and 3. Data packet [1] is manipulated at router No. 1, data packet [2] at router No. 2, and data packet [3] at router No. 3. Router No. 2 is supposed to embody the invention. Router No. 2 identifies congestion patterns of data packets coming along router No. 2 in order to determine its own manipulation rate subject to rates of data packets being marked with patterns according to a notification scheme.

As can be derived from FIG. 5, router No. 2 can identify all CE patterns set by routers that are arranged on a route of data packets from any one of the transmitters No. 1 to No. 3 to router No. 2, such as the CE pattern of data packet [1]. The process of identification is marked with an exclamation mark at the router No. 2 location. With regard to FIG. 6, which shows a block diagram of a network device 22 according to an embodiment of the present invention, a current rate of CE patterned data packets is determined as congestion experienced pattern rate ($P_{act,CE}$). The received data packets are first filtered by an ECN enabled filter 220 in order to extract ECN capable data packets. Afterwards, ECN capable data packets are filtered by a CE pattern filter 221. A determination unit 222 determines the congestion experienced pattern rate ($P_{act,CE}$). A rate which is called in the following the second manipulation rate ($P_{act,bef}$) and which represents an actual rate of data packets manipulated on a route from the transmitters to the network device equals the congestion experienced pattern rate ($P_{act,CE}$).

The CE pattern of data packet [3] cannot be detected and identified by router No. 2 as with regard to data packet [3], router No. 2 was already passed when router No. 3 is adding the CE pattern to data packet [3]. This means that a priori CE patterns set by routers which are with regard to a data packet located between the router No. 2 and the receiver, cannot be detected by router No. 2. Nevertheless, a term is introduced as third manipulation rate ($P_{act,beh}$) which represents an actual rate of data packets manipulated on a route from the network device to the receivers.

However, as can be derived from FIG. 5, the CWR marked messages of the transmitter in response to a receipt of the respective ECE marked ACK messages can all be detected by router No. 2. This includes [6],CRW message which is an indirect response to the [3],CE setting of router No. 3 with regard to data packet [3]. All CWR's can thus be detected from router No. 2—the detection indicated by exclamation marks—, whether the corresponding CE pattern was set from a router "before" or "behind" router 2. Note that CWR patterns are attached to new data packets to be transmitted, whereas ECE patterns are generally attached to ACK messages.

Thus, CWR patterned packets are filtered in a filter unit 223 and an actual measured rate of received CWR packets ($P_{act,CWR}$) is determined in determination unit 224. Such a rate reflects the total manipulation rate between transmitters and receivers as explained above, and does not only cover manipulation rates of a piece of routes the data packets take. However, ($P_{act,CWR}$) does not reflect the actual total manipulation rate, but a previous total manipulation rate since there is a delay of one RTT cycle between CE issuance and CWR issuance, as can be seen from FIG. 5.

Therefore, a fourth manipulation rate ($P_{prev,tot}$) is determined representing a previous rate of data packets manipulated on a route from transmitters of the data packets to respective receivers via the network device, the fourth manipulation rate ($P_{prev,tot}$) being set to the congestion reaction pattern rate ($P_{act,CWR}$) at the end of an RTT cycle.

The rate that is to be determined finally is the actual manipulation rate ($P_{act,dev}$) of the present network device (router 2 in FIG. 5). The actual manipulation rate can be extracted from equation [1]:

$$(P_{act,total}) = (P_{act,bef}) + (P_{act,dev}) + (P_{act,beh}) \quad [1]$$

Equation [1] basically states that a first manipulation rate ($P_{act,tot}$) representing an actual rate of data packets manipulated on a route from transmitters of the data packets to respective receivers via the network device, depends on the second manipulation rate ($P_{act,bef}$) representing an actual rate of data packets manipulated on a route from the transmitters to the network device, the actual manipulation rate ($P_{act,dev}$) according to the definition above, and the third manipulation rate ($P_{act,beh}$) representing an actual rate of data packets manipulated on a route from the network device to the receivers. Determination unit 225 is introduced in FIG. 6 to implement equation [1].

The second manipulation rate ($P_{act,bef}$) can be determined according to the actual congestion experienced pattern rate.

The third manipulation rate ($P_{act,beh}$) has to be determined by an approach since the network device currently has no glue about the manipulation rate that might occur at post-connected routers: The approach used in this embodiment is to take a rate of data packets previously dropped on a route from the network device to the receivers—introduced as fifth manipulation rate ($P_{prev,beh}$)—instead of the third manipulation rate ($P_{act,beh}$) representing the actual rate of data packets manipulated on a route from the network device to the receivers.

The fifth manipulation rate ($P_{prev,beh}$) can be derived from equation [2]

$$(P_{prev,total}) = (P_{prev,bef}) + (P_{prev,dev}) + (P_{prev,beh}) \quad [2]$$

wherein ($P_{prev,total}$) is already introduced above and can be derived from the actually measured congestion reaction pattern rate ($P_{act,CWR}$). In turn, ($P_{prev,bef}$) representing a data rate of manipulated data packets on their way from transmitters to the network device determined in a previous step is equal the congestion experienced pattern rate of a previous step ($P_{prev,CE}$) which is typically stored in the network device in a data storage 226. In addition, the previous manipulation rate of the network device ($P_{prev,dev}$) is known and accessible, preferably from a data storage 227. Thus, all parameters of equation [2] are known in order to determine the fifth manipulation rate ($P_{prev,beh}$) which in turn is used as approach for the third manipulation rate ($P_{act,beh}$) Determination unit 228 represents implementation of equation [2] in the network device 22.

In order to solve equation [1], the first manipulation rate ($P_{act,total}$) is not determined yet. In general there is a connection between a transmit rate X of the router and a total manipulation rate P according to equation [3]:

$$X = const * n * \frac{s}{RTT * \sqrt{P}} \quad [3]$$

wherein:
X is the transmit rate in bytes/sec,
n is the number of connections,
s is the packet size in bytes,
RTT is the round rip time in seconds, and
P is the manipulation rate, between 0 and 1.0, of the number of manipulation events (comparable to the definition of a loss event) as a fraction of the packets transmitted.

Origins of equation [3] will be explained in more detail later on.

With regard to equation [3], equation [4] can be generated, which transfers the general equation [3] to a specific one, where a transmit rate O, also called the total load arriving at the network device, is dependent on the total manipulation rate of the previous point in time ($P_{prev,tot}$), also known as fourth manipulation rate. For determining the total load of the network device, the arriving data packets are measured at the network device.

$$O = const * n * \frac{s}{RTT * \sqrt{P_{prev,tot}}} \quad [4]$$

Transferring equation [3] to an optimal link rate L of the router, equation [5] reads:

$$L = const * n * \frac{s}{RTT * \sqrt{P_{act,tot}}} \quad [5]$$

which is linked to the actual total manipulation rate $P_{act,tot}$ since it is appreciated to reach the optimal transmit rate L of the router by means of the actual total manipulation rate, which is introduced above as first manipulation rate $P_{act,tot}$.

Optimal transmit rate L is typically given in the spec of the router, in a data sheet or known from similar sources. The previous transmit rate O can be determined as explained below. The fourth manipulation rate ($P_{prev,tot}$) is dependent on the CWR rate as mentioned before.

When linking equation [4] and equation [5], equation [6] can be generated:

$$O*\sqrt{P_{prev,tot}} = L*\sqrt{P_{act,tot}} \quad [6]$$

$P_{act,tot}$ can now be determined according to equation [6] as all the other parameters of equation [6] are known. Equation [6] is implemented in determination unit 229 according to FIG. 6, wherein parameters L and O are determined or stored in determination unit 230. $P_{act,tot}$ can then be inserted in equation [1], completing now the parameters that are necessary in order to determine the actual manipulation rate $P_{act,dev}$.

Note, that equation [3] expressed a single flow view. However, by developing equation [6], single flow view turns into a multi flow view and determination of flow numbers or something similar is redundant.

Figure 6:
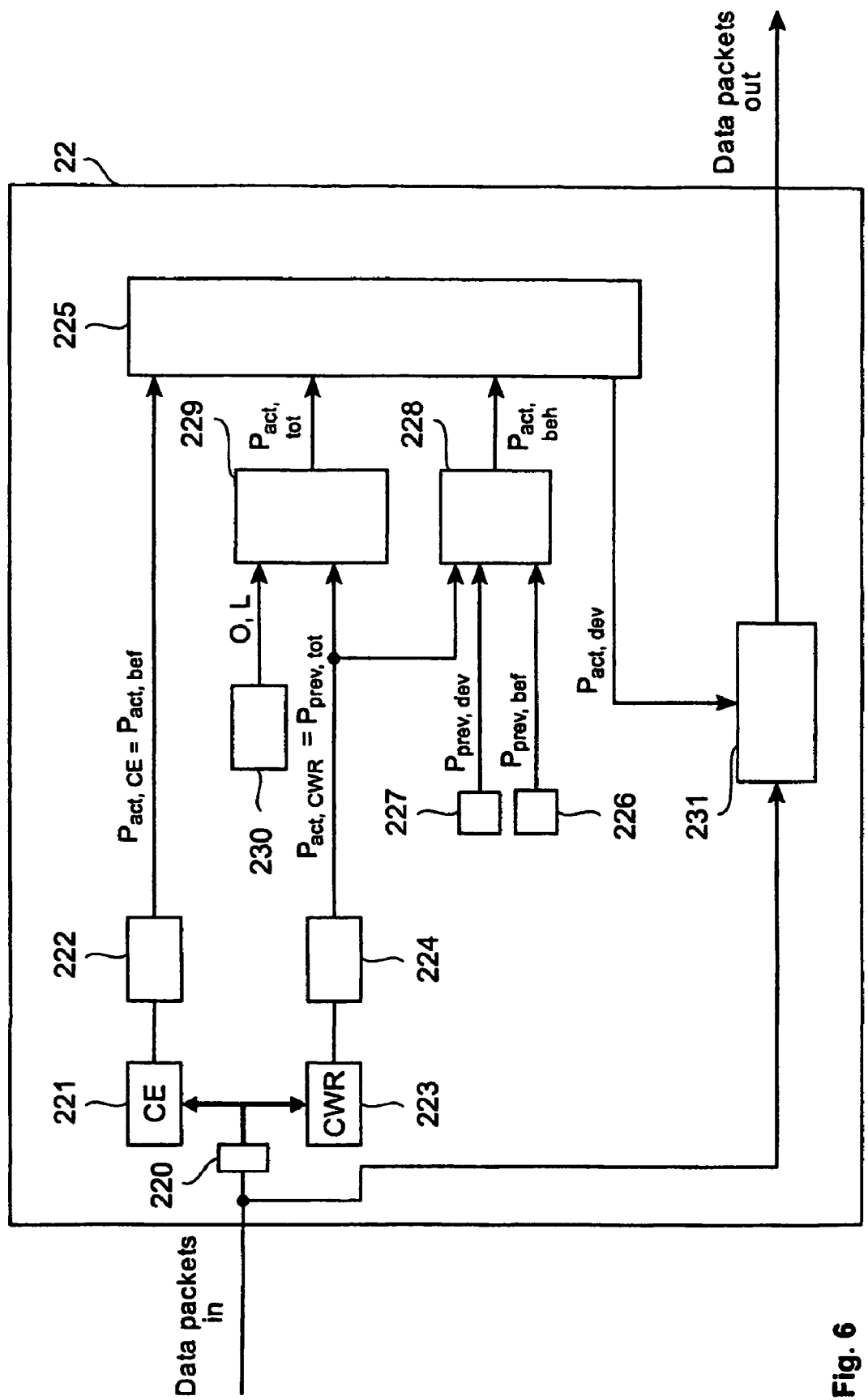
FIG. 6 a block diagram of a network device, in accordance with an embodiment of the present invention.

The actual manipulation rate $P_{act,dev}$ then acts on router function 231 and manipulates data packets which pass router function 231 at actual manipulation rate $P_{act,dev}$. Although the actual manipulation rate $P_{act,dev}$ is based on evaluation of ENC capable data packets, it can be suitable for manipulating not only ECN capable data packets in the end, as shown in FIG. 6, preferably when the rate of ECN capable data packets in relation to arriving data packets is not extraordinary low. In the present example, the actual manipulation rate $P_{act,dev}$ is acting on both ECN capable and non ECN capable data packets, however, in different ways: As ECN capable data packets are manipulated by marking, non ECN capable data packets are manipulated by dropping. In another embodiment of the invention, only the ECN capable data packets are subject to manipulation, in particular subject to marking, whereas non ECN capable data packets are not manipulated.

The determination units as explained with regard to FIG. 6 are preferably implemented as software.

In the following it is shown how different parameters might be determined. Some of the parameters might be helpful to know when handling one of the equations [1] to [6]. None of these measurements is a perfect one, but the margin of error should be small enough as not to cause any problems, even under bad circumstances.

The Round Trip Time RTT of connections that have data to send can be determined as follows: The TCP connection setup 3-way handshake time can be measured. When initializing a TCP connection the sender typically sends a SYN message which is acknowledged by the receiver with an SYN/ACK message which is typically acknowledged with an ACK message from the sender. Such initial connection setup is called 3-way-handshake. RTT can be determined by sampling some TCP SYN packets and install an appropriate filter, and wait for an ACK packet to match that filter. This is a simple measurement, that provides a good instantaneous upper bound value for the RTT. However, there is some inaccuracy, as it will only reflect the distribution of the newly-setup connections, not of active ones.

Another method for determining the Round Trip Time RTT is to evaluate ECN messages: The delay between setting CE and seeing the corresponding CWR can be measured at the network device. Even if no congestion exists at the current network device, the time may be measured for incoming packets that already have CE set. This method reflects the current traffic mix and not only newly-setup connections. However, there is not necessarily a one-to-one relationship between setting CE and seeing CWR, due to (1) non-availability of data at the sender or (2) other congestion marks, which occur before or after the particular mark and may even potentially be merged. (1), and (2) should not pose any significant problems: As it is sampled among active sources, problem (1) is very unlikely. At reasonable CE marking rates (<10%, which is already quite excessive), the effect of (2) should also not bear a practical problem. Even then, the two errors should be small and work in opposite directions; thus, they are expected to cancel each other except under rare circumstances.

Round Trip Times RTT are preferably derived from a harmonic mean of multiple RTT samples.

Manipulation rates (previously, actually) for the distance between senders and the present router are preferably determined as: Among the ECN-mapable packets, the fraction of those already marked with a congestion experienced CE.

Total manipulation rates, which are also called end-to-end loss rates for the distance between the senders and the receivers, for a previous RTT, are preferably determined as: Among the ECN-mapable packets, the fraction of those marked with CWR.

The offered load O on the congested router can be determined by an arrival rate and is typically smoothed. The arrival rate A of data packets represents the rate of data packets arriving at the network device.

As can be seen, several of these measurements rely on the use of ECN. A small, representative fraction of ECN-capable traffic should be enough for decent parameter accuracy.

A previous measurement of a rate is taken at least one RTT earlier than an actual measurement.

In general, the throughput equation [7] is:

$$X = \frac{s}{R*sqrt(2*b*p/3) + \left( t\_RTO * \left( \frac{3*sqrt(3*b*p/8)*}{p*(1 + 32*p^\wedge 2)} \right) \right)} \quad [7]$$

Wherein:
X is the transmit rate in bytes/second,
s is the packet size in bytes,
R is the round trip time in seconds, p is the manipulation event rate, between 0 and 1.0, of the number of loss events as a fraction of the number of total packets transmitted t_RTO is the TCP retransmission time-out value in seconds, b is the number of packets acknowledged by a single TCP acknowledgment.

Equation [7] can be simplified by setting t_RTO=4*R. A more accurate calculation of t_RTO is possible, but experiments with the current setting have resulted in reasonable fairness with existing TCP implementations. Another possibility would be to set t_RTO=max(4R, one second), to match a recommended minimum of one second on the RTO.

Some TCP implementations use delayed acknowledgments, sending an acknowledgment for every two data packets received, and thus have a sending rate modeled by b=2. However, TCP is also allowed to send an acknowledgment for every data packet, and this would be modeled by b=1. Because many TCP implementations do not use delayed acknowledgments, b=1 is assumed.

Equation [8] represents a simplified version of equation [7] including the mentioned simplifications:

$$X = \frac{s}{R\,sqrt(p\,2/3) + (12R*sqrt(p\,3/8)*p*(1+32p^{\wedge}2))} \quad [8]$$

Equation [8] in turn is often approximated by equation [9]:

$$X = \sqrt{\frac{3}{2}}\,s/(R*sqrt(p)) \quad [9]$$

The TCP transmit rate X depends on packet size, end-to-end RTT and the total manipulation rate at the time of occurrence of transmit rate X, as seen by the sender. Knowing the total manipulation rate in the previous cycle and knowing the current offered load which is also based on the senders' view of the manipulation rate in the previous cycle, the router can determine the manipulation rate the senders should see using one of the equations [7] to [9], and the factor by which the offered load exceeds the link rate L. There is an inverse proportionality between the link rate L and the square root of the total manipulation rate p. Thus, p' (manipulation probability to be seen)=L^2*p, with p'<p under congestion.

Assuming the other routers have not seen a significant change in load distribution, p'-p manipulation on the traffic can be assumed. There can also be a discount for manipulations prior to the present router by taking the current manipulation rate for manipulations for the distance between the senders and the present router into account. This is where the RTT estimate comes into play.

The above mentioned manipulation rates are updated in the order of the estimated RTT. In a preferred embodiment the instantaneous manipulation rate P(inst,dev) that is being updated more frequently (RTT>>dt) can be derived from:

$$P(inst, dev) = 3/2 * \frac{(S*n*((1-w\_q)*q\_avg/(L*dt) + ((1+q\_inst/(L*dt))*w\_q)))^{\wedge}2}{(RTT*L)^{\wedge}2}$$

and 0<=P(inst,dev)<=1 wherein:
S is the packet size,
n is the number of connections,
w_q is the weight of the exponential moving average,
q_avg is the average queue length evaluated by a exponential moving
average of weight w_q,
q_ist is the instantaneous queue length,
L is the maximum link rate, and
dt is the update interval.

As a result, traffic can be controlled much more directly and finer than with traditional AQM methods. Further on, the scheme is independent from the number of TCP-sessions and takes into account the current RTT distribution. Therefore the scheme increases good TCP-throughput and fairness and reduces queuing delays. It smoothes loss rates and typically improves flow performance and predictability The proposed method can be used in combination with other control mechanisms, such as methods influencing long term behaviour of manipulation rates.

The invention claimed is:

1. A network device to perform a method of controlling data packet flows by manipulating data packets according to an actual manipulation rate, comprising:
   a receiving component for receiving data packets;
   pattern filter means for, amongst the received data packets, identifying data packets that are marked with a pattern according to a congestion notification scheme;
   at least one determination unit for performing steps of:
   determining a pattern rate of data packets comprising the pattern; and
   determining the actual manipulation rate dependent on the pattern rate by the steps of;
   determining a first manipulation rate representing an actual rate of data packets manipulated on a route from transmitters of the data packets to respective receivers via the network device;
   determining a second manipulation rate representing an actual rate of data packets manipulated on a route from the transmitters to the network device;
   determining a third manipulation rate representing an actual rate of data packets manipulated on a route from the network device to the receivers; and
   determining the actual manipulation rate dependent on the first manipulation rate, the second manipulation rate and the third manipulation rate;
   wherein at least one of the first, second or third manipulation rate is based on a pattern rate.

2. A network device as recited in claim 1, wherein said device is a router for forwarding data packets.

3. A network device configured to perform a method of controlling data packet flows by manipulating data packets according to an actual manipulation rate, comprising:
   a receiving component for receiving data packets;
   pattern filter means for, amongst the received data packets identifying data packets that are marked with a pattern according to a congestion notification scheme;
   at least one determination unit for performing steps of:
   determining a pattern rate of data packets comprising the pattern; and
   determining the actual manipulation rate dependent on the pattern rate;
   determining a congestion experienced pattern rate of data packets comprising a congestion experienced pattern indicating a congestion; and
   determining a second manipulation rate dependent on the congestion experienced pattern rate.

4. A network device configured to perform a method of controlling data packet flows by manipulating data packets according to an actual manipulation rate, comprising:
  a receiving component for receiving data packets;
  pattern filter means for, amongst the received data packets identifying data packets that are marked with a pattern according to a congestion notification scheme;
  at least one determination unit for performing steps of:
  determining a pattern rate of data packets comprising the pattern; and
  determining the actual manipulation rate dependent on the pattern rate by determining a first manipulation rate dependent on a given link rate, the link rate specifying an optimum rate of data packets to be handled by the network device.

5. A network device configured to perform a method of controlling data packet flows by manipulating data packets according to an actual manipulation rate, comprising:
  a plurality of determination units for performing steps of;
  determining a first manipulation rate representing an actual rate of data packets manipulated on a route from transmitters of the data packets to respective receivers via the network device;
  determining a second manipulation rate representing an actual rate of data packets manipulated on a route from the transmitters to the network device;
  determining a third manipulation rate representing an actual rate of data packets manipulated on a route from the network device to the receivers; and
  determining the actual manipulation rate dependent on the first manipulation rate, the second manipulation rate and the third manipulation rate.

* * * * *